Jan. 3, 1950  F. E. CAIRNS, JR  2,493,386
ANTIVIBRATION PLUNGER TYPE ELECTROMAGNET
Filed Nov. 21, 1945

Inventor:
FREDERICK E. CAIRNS, JR.
By John H. Rouse,
Attorney.

Patented Jan. 3, 1950

2,493,386

UNITED STATES PATENT OFFICE 2,493,386

ANTIVIBRATION PLUNGER TYPE ELECTROMAGNET

Frederick E. Cairns, Jr., Glendale, Calif., assignor to General Controls Co., Glendale, Calif., a corporation of California Application November 21, 1945, Serial No. 630,061

4 Claims. (Cl. 175—338)

This invention relates to electromagnetic operators of the solenoid type and has for a general object the provision of means for preventing vibration or humming of the plunger when the solenoid is energized by alternating current.

In alternating-current solenoids it is customary to provide a magnetic stop, engageable by the inner end of the plunger when the same is attracted, and a shading coil adjacent the stop for maintaining plunger-holding flux during the part of the cycle in which no energizing current is flowing. Although by this arrangement vibration of the inner end of the plunger is prevented, the free or outer end of the plunger is subjected to alternations of the lateral component of the flux so that it tends to vibrate. It is therefore a more specific object of this invention to prevent such vibration by providing resilient means, effective when the plunger is in its attracted position, for applying to the outer portion of the plunger a unidirectional force substantially perpendicular to the axis of normal movement thereof.

Another object of the invention is to provide means, effective in the attracted movement of the plunger, for first applying to the outer portion of the plunger a force substantially parallel to its axis, and, when the plunger is in its stopped position, a unidirectional force substantially perpendicular to said axis.

For full understanding of the invention, and further appreciation of its objects and advantages, reference is to be had to the following detailed description and accompanying drawing, and to the appended claims.

Figure 1:
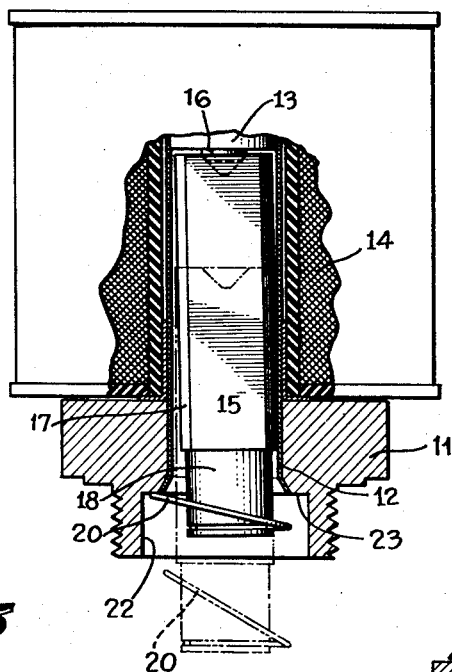
Figure 1 is a view, mainly in longitudinal section, of a solenoid operator embodying the invention.
Figure 2:
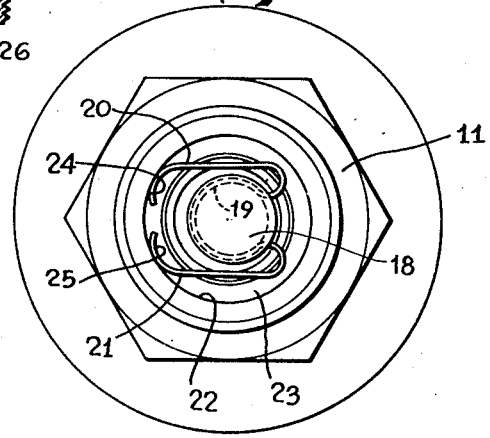
Figure 2 is a bottom view of the device shown in Fig. 1.

Referring first more particularly to Figs. 1 and 2 of the drawing, the numeral 11 indicates a base member which is externally threaded for attachment to the body of a device to be operated, such as a fluid control valve. Mounted at its lower end in an opening through the base member is a cylindrical sleeve 12, of thin non-magnetizable material, which is flared at its bottom to cooperate with a tapered portion of the base opening and is secured thereto by solder. The upper end of the sleeve 12 is closed by a stop 13, and around the sleeve is an energizing coil 14. Fitting loosely within the sleeve is a plunger member 15 having in its top surface a conical depression with which a stop-button 16, of magnetizable material, cooperates to centralize the upper end of the plunger member in the sleeve when it is in its attracted position, as shown. The major or upper portion of the plunger member 15 is generally square in cross-section and has rounded corners as indicated at 17; the reduced lower portion 18 of the member being cylindrical. It is to be assumed that the plunger member may be provided at its bottom with a stem for connection to means to be actuated, such as a valve closure.

Mounted on the outer portion 18 of the plunger member is a wire spring comprising a looped portion 19, cooperating with a circumferential recess in the member, and arms 20 and 21. When the plunger member is in its un-attracted position, as shown in broken-lines in Fig. 1, the spring arms 20—21 are free and incline steeply toward the inner end of the plunger member. To receive the spring arms, the opening through the base member 11 is enlarged at its end away from the sleeve to provide a cylindrical recess 22 and a plane-surfaced shoulder 23. In the attracted upward movement of the plunger member, the end portions 24 and 25 of the spring arms 20—21 first engage the shoulder 23 and then slide thereon into engagement with the cylindrical side-wall of the recess 22, the arms being of such length that they are slightly flexed or bowed when the plunger member is in its stopped position as shown in solid-lines in Fig. 1. It will be observed that upon initial engagement of the spring arms with the shoulder 23 a force is produced on the outer portion of the plunger member substantially parallel to the axis of normal movement thereof, and when the arms are in engagement with the side wall of the recess the force is substantially perpendicular to the axis so that the plunger member is tilted (about its centered upper end) into firm engagement with the lower wall of the sleeve 12 and any tendency for the plunger member to vibrate in lateral directions is prevented. The force produced by the engagement of the spring arms with the shoulder 23 tends to initiate the tilting action, which action becomes positive under the lateral force produced when the arms finally reach the recess side-wall. It is to be noted that while in Fig. 1 the end portions 24—25 of the arms may not appear to be in engagement with the recess side-wall, this point is made clear in the showing of Fig. 2.

Figure 3:
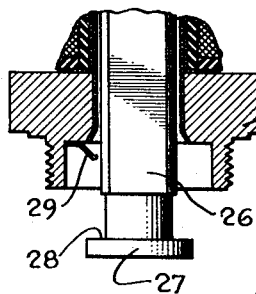
Figures 3 and 4 are fragmentary sectional views showing modified forms of the invention.

In the modified form of the invention shown in Fig. 3, the plunger member 26 has at its outer end an enlargement 27 which provides a shoulder 28 engageable, in the attracted movement of the plunger member, by the free end of a spring blade 29 secured to the base member 30; the blade being of such length that, in the final movement of the plunger member, it slides on the shoulder into engagement with the side of the plunger member to produce a unidirectional lateral force thereon.

Figure 4:
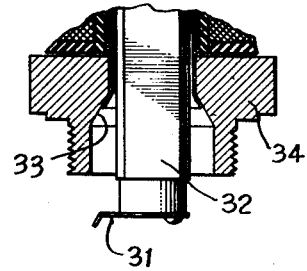

In the other modified form of the invention shown in Fig. 4, a spring blade 31, secured to the bottom of the plunger member 32, is arranged to cooperate in the attracted movement of the plunger member with an inclined inner surface 33 of the base member 34. The final result produced by this arrangement is obviously generally the same as in connection with the other forms of the invention described hereinabove.

The specific embodiments of the invention herein shown and described are obviously susceptible of modification without departing from the spirit of the invention, and I intend therefore to be limited only by the scope of the appended claims.

I claim as my invention:

1. In an A. C. solenoid: a base member; a sleeve mounted at one of its ends in an opening through said base member; an elongated plunger member freely reciprocable in said sleeve; an energizing coil around the sleeve for attracting the plunger member thereinto; stop means at the other end of the sleeve and engageable by the inner end of the plunger member when the same is attracted; means on one of said members forming, at the side of the base member away from the sleeve, a first surface in a plane transverse to the axis of movement of the plunger member, and a second surface adjacent said first surface and generally parallel to said axis; and a spring arm mounted on the other of said members and so arranged that when the plunger member is attracted the free end of the spring arm engages said first surface and slides thereon into engagement with said second surface to produce then a unidirectional force on the outer portion of the plunger member substantially perpendicular to said axis.

2. In an A. C. solenoid: a base member; a sleeve mounted at one of its ends in an opening through said base member; an elongated plunger member freely reciprocable in said sleeve; an energizing coil around the sleeve for attracting the plunger member thereinto; stop means at the other end of the sleeve and engageable by the inner end of the plunger member when the same is attracted; said base-member opening being enlarged, at its end away from the sleeve, to provide a cylindrical recess and a substantially plane-surfaced shoulder therebetween; and a spring arm mounted on the plunger member and so arranged that when the same is attracted the free end of the spring arm engages said shoulder and slides thereon into engagement with the cylindrical wall of the recess to produce then a unidirectional force on the outer portion of the plunger member substantially perpendicular to the axis of movement thereof.

3. In an A. C. solenoid: a base member; a sleeve mounted at one of its ends in an opening through said base member; an elongated plunger member freely reciprocable in said sleeve; an energizing coil around the sleeve for attracting the plunger member thereinto; stop means at the other end of the sleeve and engageable by the inner end of the plunger member when the same is attracted; said base-member opening being enlarged, at its end away from the sleeve, to provide a cylindrical recess and a substantially plane-surfaced shoulder therebetween; and a spring arm mounted at one of its ends on an outer portion of the plunger member and inclined toward the inner end thereof, the length of said spring arm being such that in the attraction of the plunger member the free end of the spring arm engages said shoulder and slides thereon into engagement with the cylindrical wall of the recess to produce then a unidirectional force on the plunger member substantially perpendicular to the axis of movement thereof.

4. In an A. C. solenoid: a base member; a sleeve mounted at one of its ends in an opening through said base member; an elongated plunger member freely reciprocable in said sleeve; an energizing coil around the sleeve for attracting the plunger member thereinto; stop means at the other end of the sleeve and engageable by the inner end of the plunger member when the same is attracted; an outer portion of the plunger member being enlarged to provide a shoulder in a plane transverse to the axis of movement of the plunger member; and a spring arm mounted on the side of the base member away from the sleeve and so arranged that when the plunger member is attracted the free end of said spring arm engages said shoulder and slides thereon into engagement with the side of the plunger member to produce thereon a unidirectional force substantially perpendicular to the axis of movement thereof.

FREDERICK E. CAIRNS, Jr.

REFERENCES CITED

The following references are of record in the file of this patent:

UNITED STATES PATENTS

| Number | Name | Date |
| --- | --- | --- |
| 2,114,961 | Gille | Apr. 19, 1938 |
| 2,239,312 | Berges | Apr. 22, 1941 |
| 2,266,618 | Stimson | Dec. 16, 1941 |
| 2,284,011 | Oliver | May 26, 1942 |
| 2,291,599 | Ray | Aug. 4, 1942 |
| 2,324,642 | Peterson | July 20, 1943 |
| 2,405,370 | Ray | Aug. 6, 1946 |
| 2,419,333 | Christiansen | Apr. 22, 1947 |